April 12, 1966     O. M. STANLEY ET AL     3,245,498

SUPERMARKET CART

Filed Sept. 24, 1963     6 Sheets-Sheet 1

INVENTORS
OSCAR M. STANLEY
CHARLES C. AVERILL

BY

Curtis, Morris and Safford
ATTORNEYS

April 12, 1966  O. M. STANLEY ET AL  3,245,498
SUPERMARKET CART
Filed Sept. 24, 1963  6 Sheets-Sheet 2
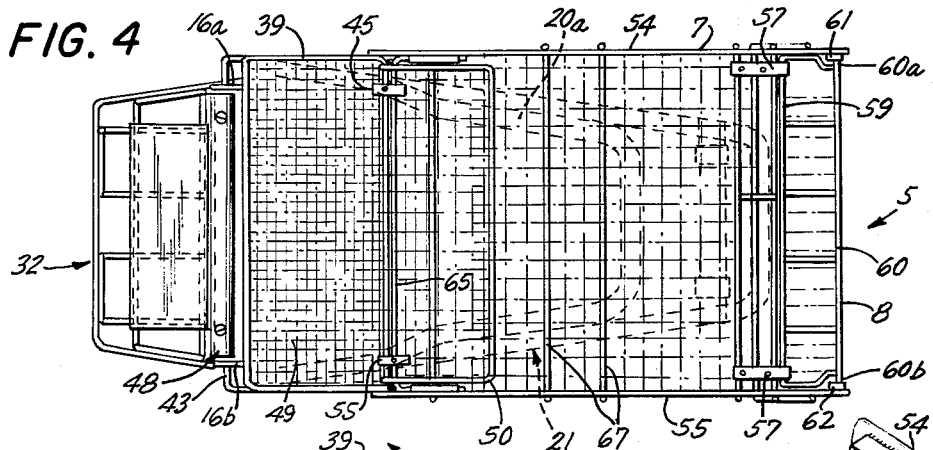
FIG. 4
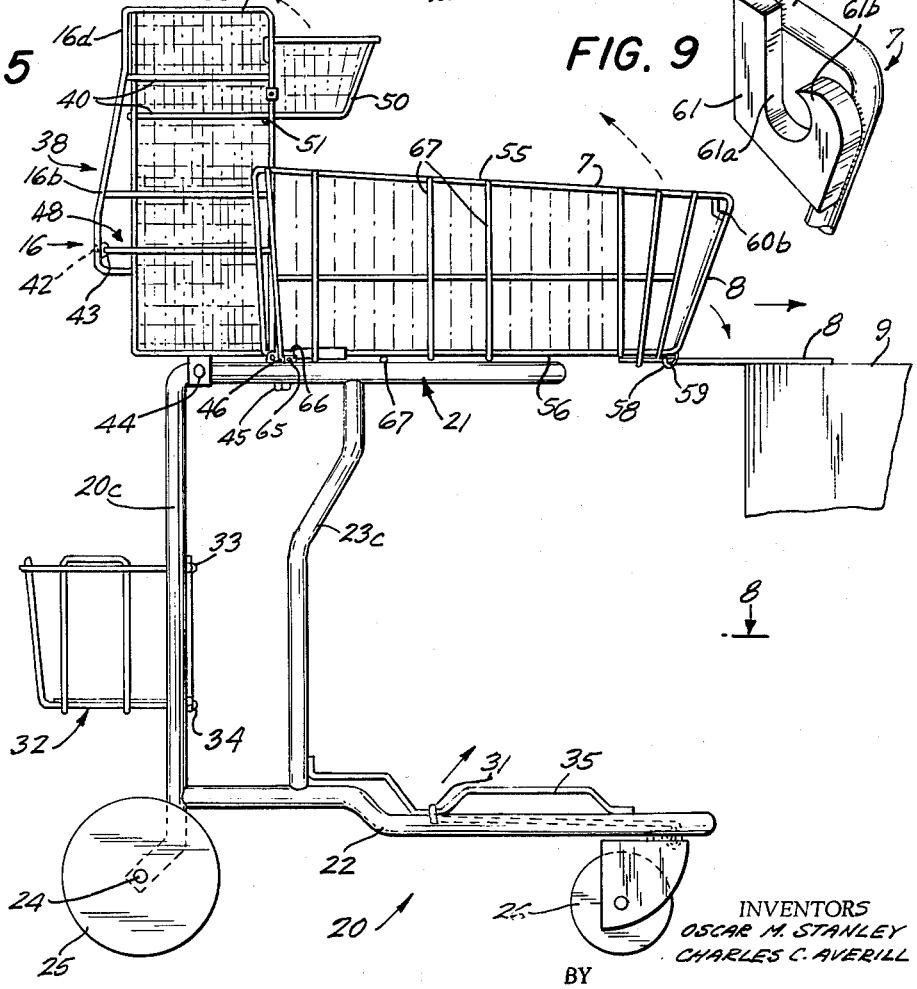
FIG. 5
FIG. 9
INVENTORS
OSCAR M. STANLEY
CHARLES C. AVERILL
BY
Curtis, Morris and Safford
ATTORNEYS

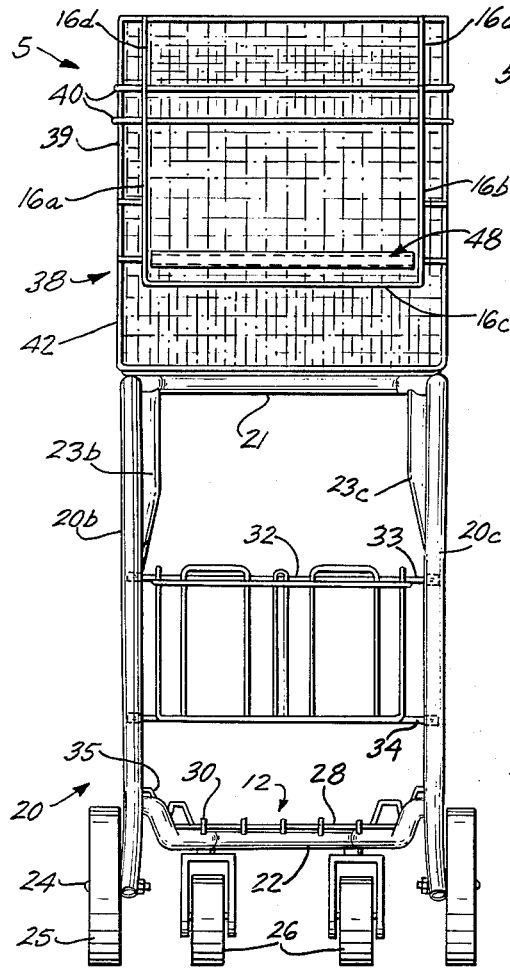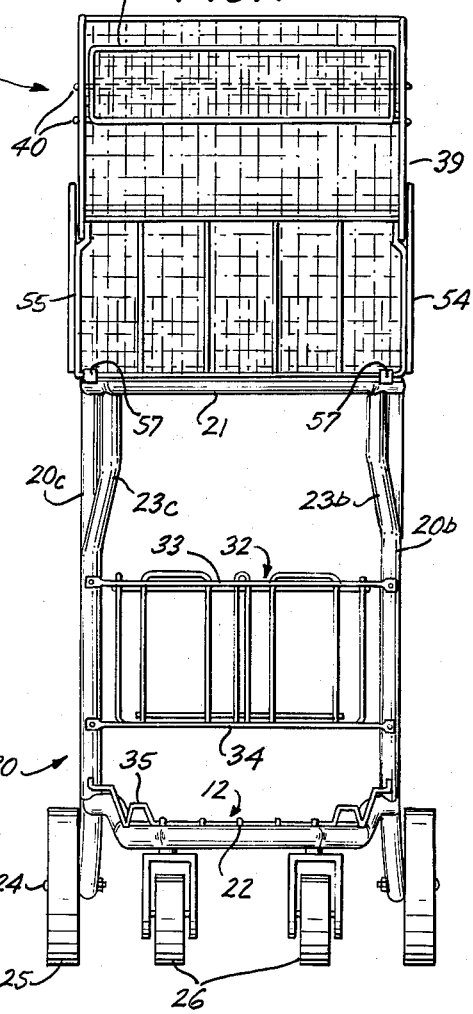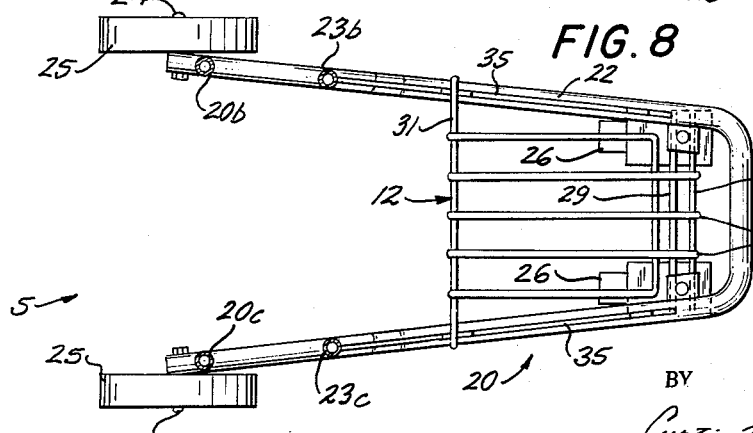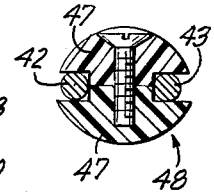

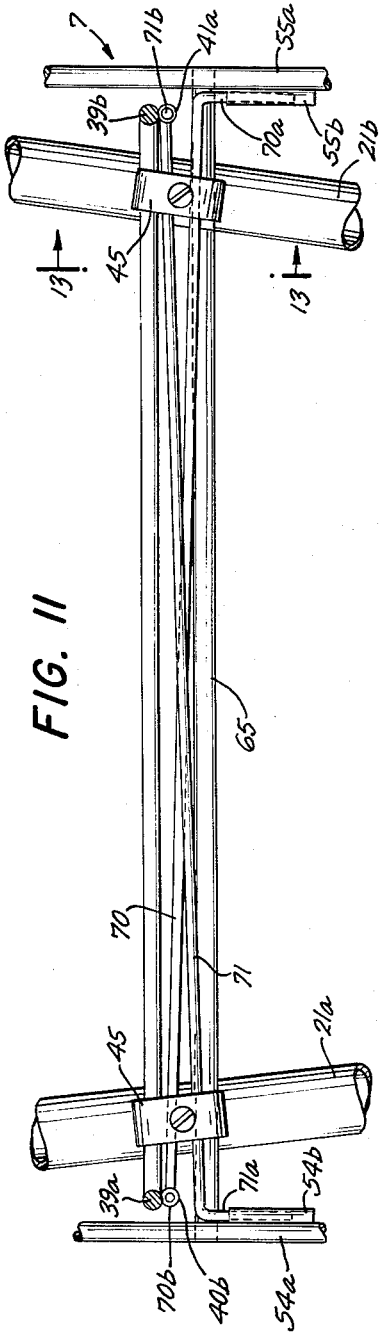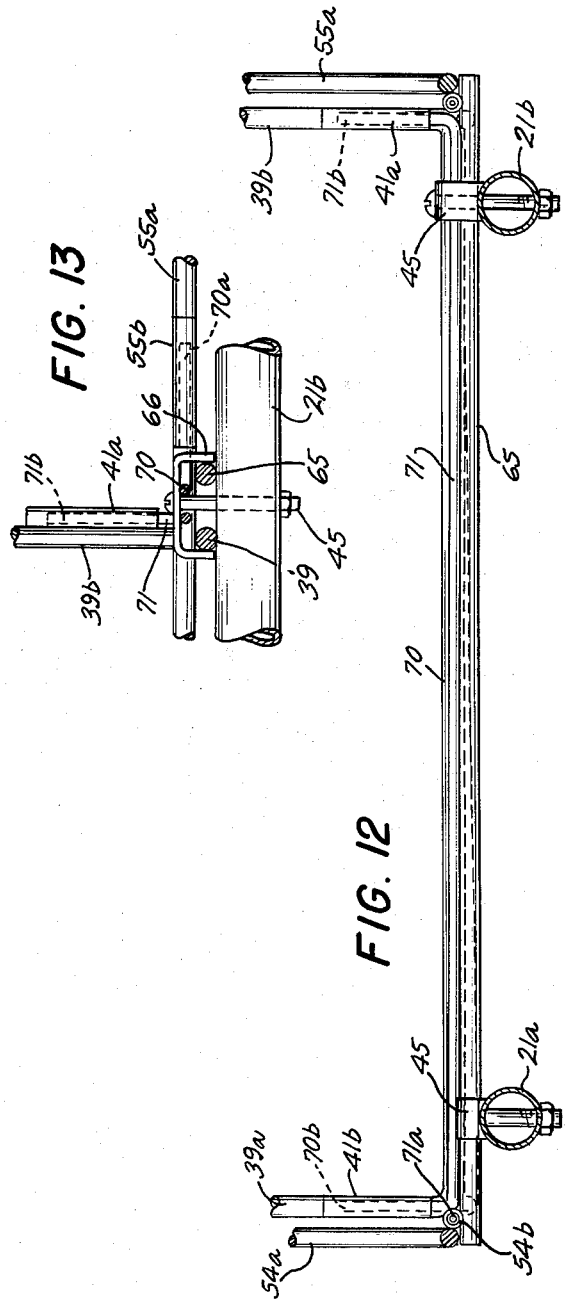

April 12, 1966   O. M. STANLEY ET AL   3,245,498
SUPERMARKET CART

Filed Sept. 24, 1963   6 Sheets-Sheet 5

INVENTORS
OSCAR M. STANLEY
CHARLES C. AVERILL
BY
*Curtis, Morris and Safford*
ATTORNEYS April 12, 1966     O. M. STANLEY ET AL     3,245,498

SUPERMARKET CART

Filed Sept. 24, 1963     6 Sheets-Sheet 6

INVENTORS
OSCAR M. STANLEY
CHARLES C. AVERILL
BY
Curtis, Morris and Safford
ATTORNEYS

United States Patent Office 3,245,498
Patented Apr. 12, 1966

3,245,498
SUPERMARKET CART
Oscar M. Stanley, New York, N.Y., and Charles C. Averill, Albion, Mich., assignors, by direct and mesne assignments, to said Stanley, New York, N.Y.
Filed Sept. 24, 1963, Ser. No. 310,988
18 Claims. (Cl. 186—1)

The present invention relates to improvements in carts of the type described and claimed in the United States Letters Patent to Oscar M. Stanley 3,039,783 issued June 19, 1962. Such carts may be used to transport articles from one location to another as, for example, to transport grocery items from the shelves to the check-out counter in a market.

The cart described in said patent comprises a wheeled vehicle which mounts a stationary upright body in the form of a fixed receptacle and a forwardly projecting hinged receptacle having an inclined end. The forwardly projecting receptacle is hinged on the frame along its rearward bottom edge and below the forwardly projecting inclined end. The rear of the cart is provided with an abutment slide inclined at such an angle to a line through the pivot and forward edge of the receptacle as to cause the receptacle of one cart to rock on its hinge to an upright position when its front end engages the abutment slide of another cart. Also the frame of each cart is so shaped as to telescope and nest in the frame of adjacent carts so that a plurality of carts may be stacked in a compact arrangement with the hinged receptacles of the carts in an upright position.

One of the objects of the present invention is to provide an improved cart of the type indicated in which the hinged receptacle may be moved to either its upright or lowered position and be shifted from one position to the other by the application of only a slight manual force.

Another object is to provide a cart of the type indicated with an improved telescoping frame construction for mounting receptacles for rocking movement and provide a handle structure for automatically rocking the receptacles as the carts are moved into engagement with each other.

Another object is to provide a cart of the type indicated having improved features of construction for co-operation with a check-out counter to reduce the chance for pilferage by providing access to all parts of the cart by the check-out clerk without leaving his station and facilitating his unloading of the cart without customer participation.

Another object is to provide a cart of the type indicated having a greater capacity in a cart of the same dimensions and permit compartmentation for selective segregation of different items to be transported.

Another object is to provide a cart of the type indicated with a baby seat so located as to protect the child's safety, eliminate unsanitary conditions and strengthen the frame of the cart.

Another object is to provide a cart of the type indicated having a lower as well as an upper receptacle pivotally mounted for rocking movement from a lower operative to an upright stacking position.

Still another object is to provide an improved cart which is of a relatively simple, compact and rugged construction requiring a minimum of maintenance and repair, economical to manufacture and one which may be easily handled and operated.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 4 is a plan view of the improved cart;

FIGURE 5 is a side elevational view of the cart and showing the manner of mounting the rigid and hinged receptacles on the frame, the compartmental gasket-like tray hingedly mounted on the rigid receptacle and the movable gate on the forward end of the hinged receptacle;

FIGURE 6 is a rear view of the cart showing the structure at the rear of the rigid receptacle forming abutment slides and a handle;

FIGURE 7 is a front view of the cart showing the forwardly tapered shape of the frame to adapt it to nest in similar frames;

FIGURE 8 is a sectional plan view taken along line 8—8 of FIGURE 5 to show the baby seat and rack on the frame below the hinged receptacle;

FIGURE 9 is a detail view to show the shape of the slots in the latch plates for retaining the gate closed;

FIGURE 10 is a detailed view to show the construction of the handle;

FIGURE 11 is a plan view of torsion rods connected between the rigid receptacle and forwardly projecting hinged receptacle for producing a force on the latter opposing the force of gravity;

FIGURE 12 is an enlarged sectional view taken on line 12—12 of FIGURE 4 to show the opposite ends of the torsion rods connected to the upright rigid receptacle;

FIGURE 13 is a sectional view taken along line 13—13 of FIGURE 11 to show the adjacent ends of the separate torsion rods connected to the rigid and movable receptacles;

Figure 1:
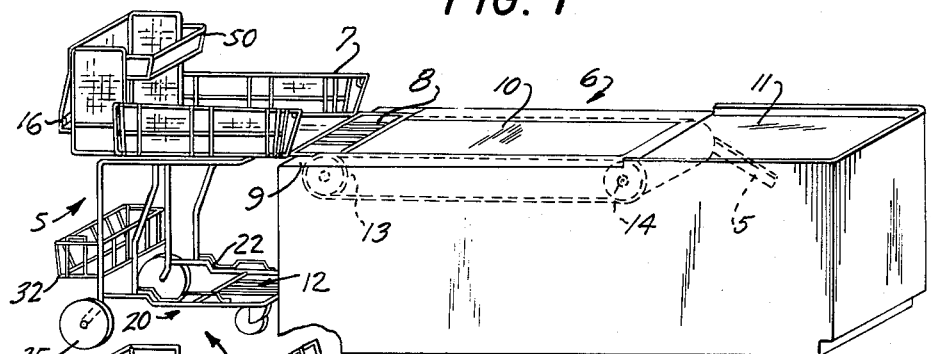
FIGURE 1 is a perspective view of a cart incorporating the novel features of the present invention and shown at the end of a check-out counter with which it is used to facilitate the unloading of articles therefrom.
Figure 2:
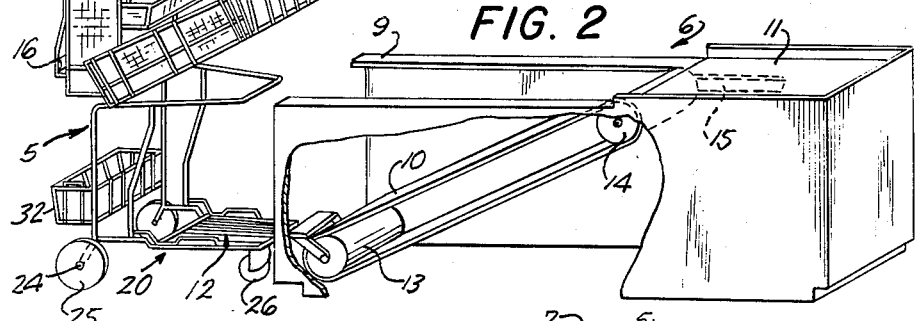
FIGURE 2 is a view similar to FIGURE 1 showing a conveyor on the check-out counter moved so as to facilitate unloading from a supporting structure below the receptacle.

Referring now to the drawings, FIGURES 1 and 2 illustrate a cart 5 incorporating the novel features of the present invention and particularly designed for use in markets to convey articles from shelves to a check-out counter 6. It is to be understood, however, that the present invention may be provided in carts used in other places as, for example, in factories, warehouses, post offices, business offices and the like, for transporting other kinds of articles or merchandise. As shown in FIGURE 1 the forwardly projecting receptacle 7 of the cart 5 is of such as height as to adapt a gate 8 at its forward end to swing down into alignment with the top surface 9 of the check-out counter 6. Articles may then be withdrawn from the open end of the receptacle onto a traveling conveyor belt 10 in the check-out counter 6 which delivers the articles to a stationary shelf 11 where they are packed in bags. FIGURE 2 illustrates how the conveyor may be tilted from the horizontal position illustrated in FIGURE 1 into alignment with the forward end of a rack or receptacle 12 on the cart below the receptacle 7 to unload articles therefrom and transport them to the shelf 11. For this purpose the pulleys 13 and 14 on which the conveyor belt 10 travels are mounted on a frame adapted to tilt around the axis of the pulley 14. To simplify the illustration in FIGURES 1 and 2, however, the frame is not shown, but a manually operable lever 15 is shown for rocking or controlling the rocking of the conveyor from the position illustrated in FIGURE 1 to that illustrated in FIGURE 2. FIGURE 2 also illustrates how the movable receptacle may be raised to permit access to and visual examination of the rack 12 by the check-out clerk without leaving his station.

Figure 3:
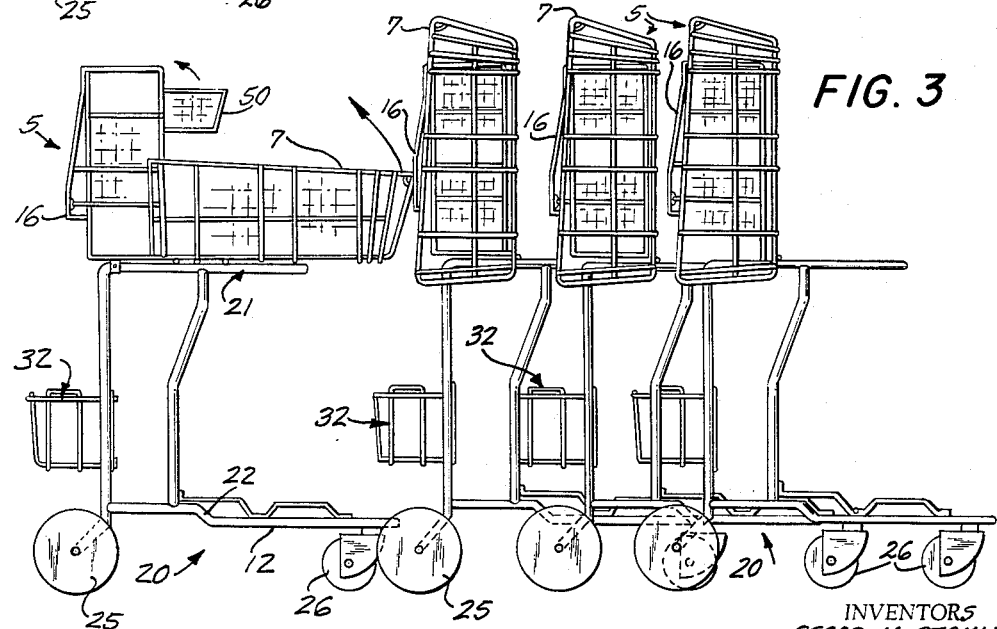
FIGURE 3 is a side view showing how a plurality of carts may be stacked in compact relation and the manner in which the forwardly projecting receptacle of a cart is automatically rocked to an upright position.

FIGURE 3 illustrates the manner in which a number of carts 5 may be telescoped in a nested compact arrangement, one behind the other, with the forwardly projecting hinged receptacles rocked to an upright position. This figure also illustrates how an empty cart 5 may be moved into stacked relationship with a number of other carts. During such movement the end of the forwardly projecting receptacle 7 of one cart engages an abutment slide 16 at the rear of another cart to rock the receptacle of the first mentioned cart to an upright position. One form of construction for such stacking of the carts in a compact arrangement and automatically rocking the receptacles 7 is described and illustrated in U.S. Patent No. 3,039,783, referred to above.

As shown in detail in FIGURES 4 to 6 each cart comprises a frame 20, preferably constructed of metal tubing, and bent to form upper and lower horizontal supports or open platforms 21 and 22. As shown in FIGURE 4 the upper support 21 is formed by a loop 20a of the metal tubing forming the frame 20 and the ends of the tubing at the rearward end of the loop project downwardly to form spaced stanchions 20b and 20c as shown in FIGURE 6. The lower horizontal support 22 is formed by another loop of the metal tubing, see FIGURES 5 and 8, having its rearward ends welded to the upright stanchions 20b and 20c. Additional upright struts 23b and 23c extended between the upper and lower loops of tubing forming the supports 21 and 22 to further strengthen the frame. The lower ends of the stanchions 20b and 20c of the frame project rearwardly and having wheels 25 mounted thereon either in the form of rigid or swivel casters or mounted on laterally extending axles 24 as illustrated. Casters 26 are mounted to swivel at the forward end of the lower support 22 to permit the cart to be turned. As will be observed by reference to FIGURES 6 to 8, the forwardly projecting loops of the metal tubing forming the upper and lower supports 21 and 22 are tapered inwardly as they project forwardly to adapt the frames of adjacent carts to nest one within the other in the manner illustrated in FIGURE 3. It will further be observed that the lower support 22 extends forwardly beyond the upper support 21 and that the struts 23b and 23c are offset adjacent the lower ends to accommodate a baby seat, later to be described when carts are nested.

The forwardly projecting tubular loop of the lower support 22 is offset downwardly just forwardly of the upright struts 23b and 23c and the rack 12 is mounted thereon as shown more in detail in FIGURE 8. Space bars 28 and 29 extend across the lower support 22 and are fastened at their ends to the opposite sides thereof. Casters 26 are attached to the spaced bars 28 and 29 and one bar 28 forms a pivot for the extended ends of rods 30 of the rack 12 which are bent to encircle the bar. The opposite end of rods 30 are connected to a cross bar 31 having laterally projecting ends which overlie and are adapted to rest on the space sides of the tubular loop forming support 22. Thus, the rack 12 co-operates with the tubular loop to form a support for articles which is slightly inclined upwardly toward the rear of the cart and is adapted to tilt forwardly. Also the tubular loop of the frame forming the lower support 22 has upwardly projecting side rails 35 mounted thereon which co-operates with the rack 12 to hold articles.

A baby seat 32 is mounted on frame 20 and in the illustrated embodiment is shown mounted between the upright stanchions 20b, 20c of the frame and projecting rearwardly from any part of the cart used to carry merchandise. The seat 32 may be formed of any suitable material such as a plastic bottom and open mesh back and sides of wire rods shaped to form the seat, and the seat is supported by transverse rods 33 and 34 extending between the stanchions 20b and 20c. For example, the supporting rods 33 and 34 may be part of the baby seat and attached by bolts to the sides of the parts which they contact, or they may be welded thereto. In addition to supporting the seat 32, the rods 33 and 34 act as braces between the stanchions 20b and 20c.

Cart 5 has an upright receptacle 38 fixedly mounted on the upper support 21 at the rear of the forwardly projecting receptacle 7. Both the hinged receptacle 7 and fixed receptacle 38 may comprise open wire-mesh supported in marginal frames of heavier gauge metal rods, or may be made of any other suitable material such as sheet metal or woven or molded plastics or the like. The fixed upright receptacle 38 has opposite sides, a bottom and back rigidly supported by the marginal rod 39 at the front and top edges. One or more U-shaped rods 40 are also provided which abut and are attached to the sides and back of the receptacle 38 and with the ends attached to the upright sections of rods 39 as by welding to provide a basket like structure having an open front and top. The abutment slide 16 is formed by spaced upright sections 16a and 16b, see FIGURES 5 and 6, which are spaced from the rear of the receptacle. In the illustrated embodiment, the sections 16a and 16b are formed by a rod frame having an intermedate section 16c overlying the back of the fixed receptacle 38 and is attached thereto as by welding. The rod frame extends rearwardly from opposite ends of the intermediate section 16c, then vertically and then forwardly toward the back of the receptacle to form the abutment slide sections 16a and 16b. Vertically extending ends 16d project upwardly from the forwardly inclined sections to overlie the back of the receptacle 38 and are attached thereto as by welding.

A transverse rod 42 extends between the rearwardly projecting portions of the abutment slide frame sections 16a and 16b and is attached thereto as by welding. A second rod 43 is mounted on the back of receptacle 38 in spaced relation to the transverse rod 42 between the slide frame sections 16a and 16b, see FIGURES 5 and 10, and bridging wood sections 47 are attached to each other between the rods to form a handle 48.

The receptacle 38 is attached to the upper support 21 of the frame 20 by means of brackets 44 and 45, see FIGURE 5. Brackets 44 are attached to the bottom of the receptacle 38 as by welding and bolted to the spaced sides of the tubular loop of frame 20 forming the upper support 21. Brackets 45 are bolted to the frame 20 and have a clamp 46 forwardly of the brackets 43 overlying the transverse section of the rod frame 39 at the front edge of the receptacle.

The fixed receptacle 38 is divided into sections by one or more shelves 49 extending between the sides and along the back of the receptacle and attached thereto as by welding. This shelf or shelves 49 permit segregation of articles to distinguish it from a dump bin in which all of the articles are placed, one over the other. A smaller tray 50 having a bottom, sides and front is mounted on receptacle 38 to project forwardly therefrom with its bottom aligned with the shelf to form a basket-like container within the receptacle. The tray 50 is arranged with its sides within the sides of the receptacle and the rearward edges of its sides are pivotally connected to the rod like frame 39 and between the top and bottom so that it may rock into the receptacle. The bottom edge of the tray 50 is adapted to abut the forward edge of the shelf to limit its forward movement so that the bottom of the tray forms a continuation of the shelf.

The forwardly projecting receptacle 7 has side walls 54 and 55, a bottom wall 56 and an open top and ends. The receptacle 7 also may be formed by metal wire mesh supported in a marginal frame of heavier gauge rods as previously explained, or may be made of any other suitable material, such as sheet metal or woven or molded plastics, or the like. The forward end of the receptacle 7 is closed by the gate 8 and, as previously described, the side walls 54 and 55 have forwardly projecting inclined ends. Mounted on the bottom wall 56 of receptacle 7 adjacent its forward end are spaced brackets 57 having loops 58 overhanging the end of and depending below its bottom wall. Loops 58 of brackets 57 enclose a transverse rod 59 at the lower end of the gate 8 with a loose fit to mount the gate for swinging and upwardly sliding movement. The upper end of the gate 8, see FIGURE 4, has a transverse rod 60 with projecting ends 60a and 60b engaging slots 61a and 62a in brackets 61 and 62 in the upper forwardly inclined ends of the side walls 54 and 55. As will be observed by reference to FIGURE 9, the slots 61a and 62a have rearwardly inclined lips 61b and 62b, respectively, to provide latching detents to retain the gate against disengagement of the gate 8 from side walls 54 and 55 of the receptacle by merely moving it upwardly. Thus, it is necessary to move the upper edge of gate 8 rearwardly as well as upwardly to disengage the projecting ends 60a and 60b of rod 60 from the rearwardly inclined detents 61b and 62b in slot 61 and 62, so as to permit it to be swung from the position illustrated in full lines to the position illustrated in dotted lines in FIGURE 5.

The side walls 54 and 55 of the forwardly projecting receptacle 7 are located outside the sides of fixed receptacle 38 adjacent the rearward end thereof. Receptacle 7 has a rod 65 at the rearward edge of its bottom wall 56 which is enclosed by flanges 66 of the brackets 45 to hinge the receptacle on the support 21 for rocking movement thereon. The receptacle 7 also has a plurality of U-shaped transverse rods 67 forwardly of pivot rod 41 which enclose and are attached to the bottom and sides of the receptacle and bear on the top of the loop of metal tubing forming the upper support 21. Thus, the forwardly projecting receptacle 7 is mounted on the upper support 21 for rocking movement from a horizontal to an upright position as illustrated in FIGURE 3. When the forwardly projecting receptacle 7 is rocked to an upright position its side walls 54 and 55 overlie the sides of the stationary receptacle 38 and rocks the tray 50 to an upright position therebetween.

The receptacle 7 of each cart 5 is adapted to rest in equilibrium in either its forwardly extending or upright positions, and is counterbalanced so that it may be moved from one to the other of the positions by the application of only a slight manual force in the direction of movement. Such counterbalancing of receptacle 7 prevents its acceleration as it moves downwardly by gravity to prevent slamming against the support 21 as it comes to a stop. Preferably, the receptacle 7 should be counterbalanced so as to substantially equal the force of gravity in its downward position or it may at some instance produce an opposing force on the receptacle 7 slightly less than the force of gravity to provide a slight over balance in its lowered outwardly extending position of, for example, eight ounces.

A preferred form of counterbalancing mechanism comprising torsion rods 70 and 71 is shown in detail in FIGURES 9 to 11. In FIGURE 11 the tubular pieces 21a and 21b represent the spaced sides of the forwardly tapered loop forming the upper support 21, see FIGURE 5, the rods 39a and 39b are the upright sections of the marginal frame rod 39 of the receptacle 38, and the rods 54a and 55a are lower horizontal rods on the side walls 54 and 55 of the forwardly projecting receptacle 7. The transverse pivot rod 65 on which the receptacle 7 hinges is also shown. As shown most clearly in FIGURE 11, the torsion rod 70 extends across the bottom of the receptacle 7 and has an angular end 70a extending into a sleeve 55b attached to the frame rod section 55a on the bottom of the receptacle 7 forwardly of the pivot rod 65, and an angular end 70b extending into a sleeve 41b on frame section 39 of the fixed receptacle 38. The torsion bar 71 also has a forwardly projecting angular end 71a extending into a sleeve 54b at the bottom of the receptacle and extends across the platform 21 with an angularly projecting end 71b in a sleeve 41a at the front of the fixed receptacle 38. As shown in FIGURES 11 and 13 the torsion rods 70 and 71 extend through the brackets 45 on the upper support 21 of frame 20 but this is merely for convenience in locating the rods adjacent the hinge. The torsion rods 70 and 71 apply a torque between the fixed and movable receptacles 38 and 7 tending to rock the latter to an upright position against the action of gravity. When the receptacle 7 is in its lowered position its center of gravity is located forwardly of the hinge axis and the torsion rods 70 and 71 produce a force on the receptacle equal to or slightly less than the force of gravity. When the receptacle 7 is in its raised position its center of gravity is at the opposite or rearward side of the hinge axis and the torsion rods are so designed as to produce a small force on the receptacle to hold it in its upright position. Between the raised and lowered positions of the receptacle 7, the torsion bars 70 and 71 produce a progressively increasing force on the receptacle.

Figure 14:
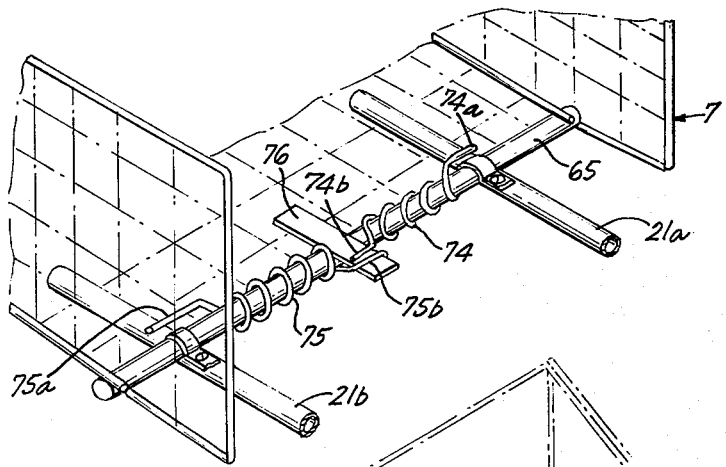
FIGURE 14 is a perspective view of a modified arrangement of coil springs acting between the rigid and movable receptacles.

In place of torsion rods, the forwardly projecting receptacle 7 may be counterbalanced by opposed helical springs 74 and 75 as illustrated in FIGURE 14. As illustrated diagrammatically in FIGURE 14 the springs 74 and 75 are coiled about the pivot rod 65 at one side of the center and have projecting ends 74a, 75a and 74b, 75b engaging the tubular frame section 21a, 21b and a plate 76 on the bottom of the receptacle 7, respectively. Springs 74 and 75 are tensioned to produce an upward force on receptacle 7 opposing the force of gravity to facilitate easy handling and prevent slamming when the receptacle is lowered.

Figure 15:
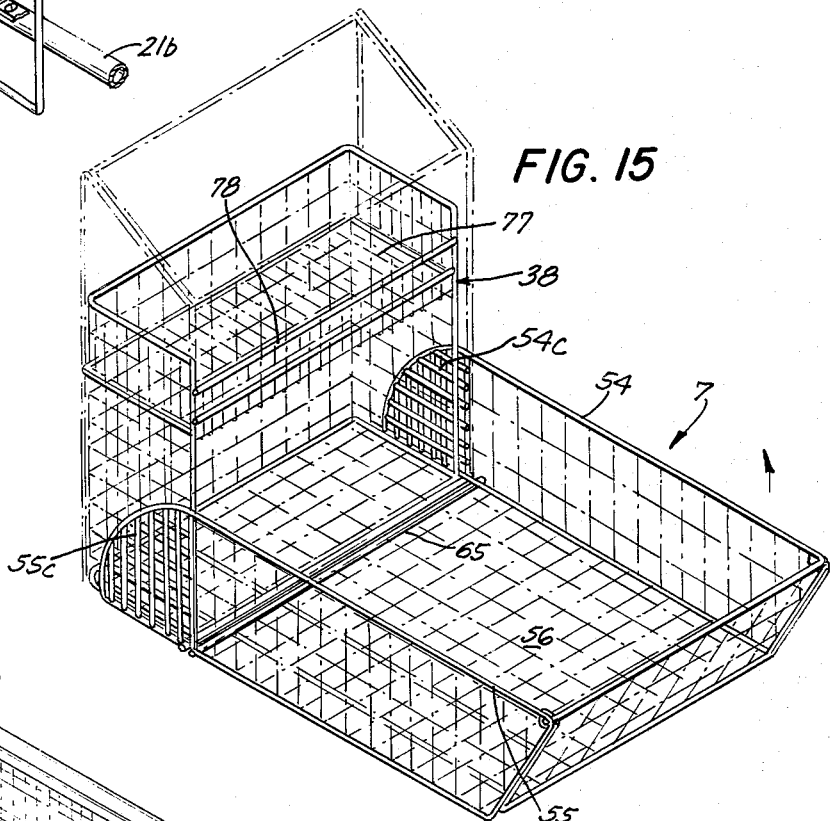
FIGURE 15 is a perspective view of a further modified arrangement in which the sides of the forwardly projecting receptacle have counterweights extending rearwardly beyond its hinge axis and illustrating a fixed shelf on the rigid receptacle.

A counterbalancing arrangement of still further modified construction is illustrated in FIGURE 15. In this form of construction the side frames 54 and 55 of the receptacle 7 extend rearwardly beyond the bottom wall 56 and pivot rod 65 at the sides of the body 38. These rearward extensions 54c and 55c of the side walls 54 and 55 of the receptacle 7 are made of a heavier weighted material to provide moment arms at the left hand side of the pivot rod 65, as viewed in FIGURE 15, which is equal and opposite the moment arm at the right hand side of the pivot rod produced by the weight of receptacle. Thus, the forwardly projecting receptacle 7 is counterbalanced by a force opposing the force of gravity which would normally act to accelerate the downward movement of the receptacle 7 and cause it to slam against the upper support 21. It will be understood that counterweights may be mounted on the rearward extensions 54c and 55c of the sides of the receptacle. Furthermore, the counterbalancing means of the present invention contemplates interengaging function disks, dash-pots and other braking means acting between the hinged and fixed receptacles 7 and 38 to produce a force opposing the force of gravity.

FIGURE 15 also illustrates a shelf 77 having a fixed front wall 78 flush with the front of the receptacle 38 to provide a separate space for fragile items to be transported. This shelf 77 and front wall 78 correspond to the shelf 49 and tray 50 of the cart illustrated in FIGURES 1 to 8 and can be substituted therefor.

Figure 16:
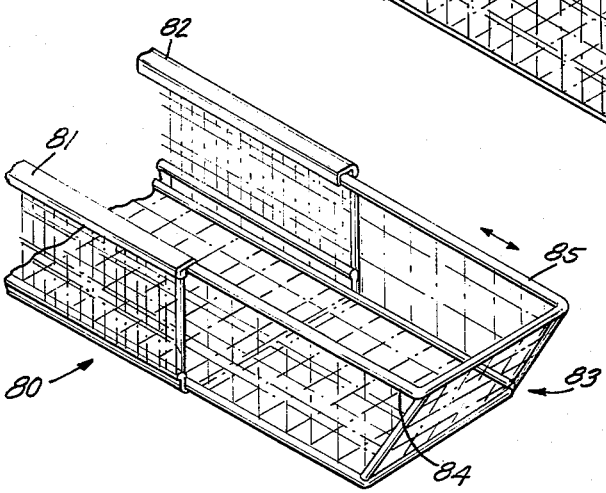
FIGURE 16 is a perspective view of a movable receptacle of modified construction to adapt it to be extended.

In FIGURE 16 a receptacle 80 of still further modified construction is illustrated which permits an increase in its capacity. In this form of construction the receptacle 80 is of generally channel shape form having rails 81 and 82 at its upper edges folded inwardly and downwardly to provide guides for a slide. A second receptacle section 83 has a bottom, sides and front gate with rails 84 and 85 adapted to slide in the guides 81 and 82. Thus, the receptacle 80 may be extended by pulling the forward section 83 outwardly with respect to the rearward section or may be contracted by sliding the forward section rearwardly.

Figure 17:
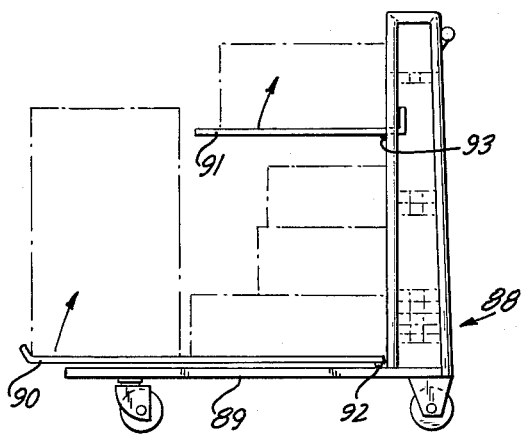
FIGURE 17 is a side elevational view of a cart having forwardly projecting upper and lower platforms to adapt it for use as a small truck for transporting articles.

FIGURE 17 illustrates another modified construction of cart in which a wheeled frame 88 is generally similar to that illustrated in FIGURES 1 to 8. This wheeled frame has only one lower platform 89 which mounts a rack 90 and a second upper rack 91 pivotally mounted on the upright portion of the frame. Both of the racks 90 and 91 are pivotally mounted to fold upwardly on pivot rods 92 and 93, respectively, to adapt a series of the wheeled frames to be stacked in a compact nested relationship.

Figure 18:
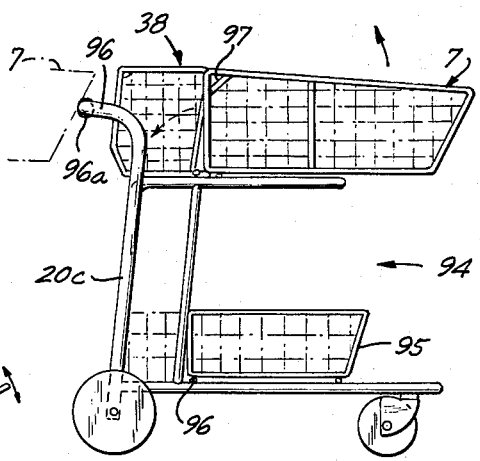
FIGURE 18 is a side elevational view of a cart of further modified construction having upper and lower movable receptacles.

FIGURE 18 illustrates a still further modified construction of cart 94 having a lower forwardly projecting receptacle 95 as well as the upper receptacle 7. The lower receptacle 95 is hingedly mounted the same as the upper receptacle 7 and both of the receptacles are adapted to rock to an upright position when the carts are moved into stacked relation. For this purpose it will be noted that the upright stanchions 20c at the rear of the frame 20 project upwardly and forwardly for engagement by the forwardly inclined end of a lower receptacle 95 to automatically tilt the latter upwardly. In addition, the cart shown in FIGURE 18 has a handle 96 projecting rearwardly from the frame 20 and having a transverse hand grip 96a positioned rearwardly of fixed receptacle 38 a sufficient distance so that the transverse hand grip will serve as an abutment for engagement by the forwardly inclined end of receptacle 7 to cam it upwardly. A hinged plate 97 also is provided which normally lies against the bottom and back of the fixed receptacle 38, but which may be folded upwardly to form a back for a baby seat in which the child faces the rear with his legs extending through openings in the back of the receptacle. In this construction as well as in the previously described constructions, a single pivoted receptacle or basket 7 may be used without a stationary receptacle 38.

Figure 19:
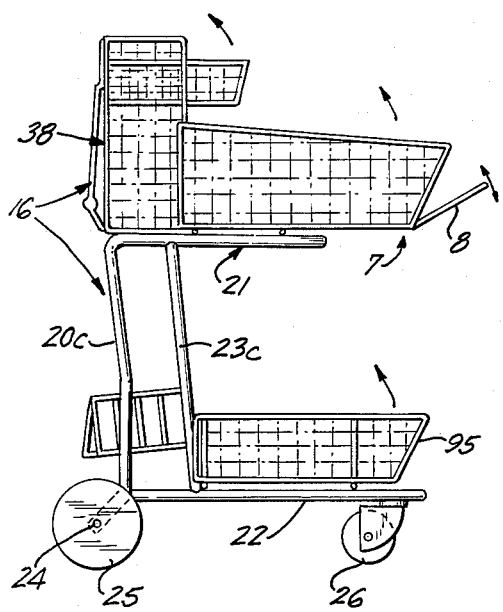
FIGURE 19 is a side elevational view illustrating a still further modified construction of a cart having upper and lower receptacles together with a seat for an infant.

FIGURE 19 illustrates a still further modified form of construction combining the type of cart illustrated in FIGURES 1 to 8 with a lower receptacle of the type shown in FIGURE 18 together with a baby seat. In this construction as in the one illustrated in FIGURE 18, both upper and lower receptacles 7 and 95 are mounted to rock from a forwardly extending into an upright position. Furthermore, the rearward upright struts 20c of the frame 20 as well as the rails at the rear of the receptacle 38 provide an abutment slide 16 for engagement by the forward ends of the respective baskets.

All of the cart constructions illustrated in the drawings provide a wheeled vehicle for transporting articles from one location to another. When the carts are to be stacked they may be run against a wall or the rearward side of an adjacent cart. Due to the fact that the receptacles are hinged at the bottom and rearward edge thereof and have a forwardly projecting inclined construction in which the upper forward edge of the receptacle of one cart first contacts a wall or abutment slide of an adjacent cart, the receptacle is automatically rocked from a horizontal forwardly projecting position to an upright position. Thus, by merely moving a plurality of carts into contact with each other they may be stacked in a compact arrangement. The construction also provides a cart which will reduce pilfering, provide for compartmentation to segregate articles and give a greater capacity in the same area of carts previously used. Furthermore, the counterbalancing of the receptacles produces a more uniform movement of the receptacles from one to the other of its two positions without slamming when coming to a stop. Also, the counterbalancing arrangement permits the receptacle to be moved by the application of only a slight manual force in either direction. Such rocking movement of the receptacle is augmented by the torsion bars to produce an equilibrium condition in either of its positions. The torsion springs illustrated in FIGURE 14 operate in substantially the same way as the torsion bars and substantially the same counterbalancing effect can be produced by the counterbalancing extensions illustrated in FIGURE 15. By using a construction of receptacle as illustrated in FIGURE 16, its capacity may be increased by merely sliding one section with respect to the other. In those places where it is desired to transport articles as, for example, in a factory, the type of cart illustrated in FIGURE 17 may be used which also permits stacking in a compact assembly. Additional lower receptacles may also be provided on the cart of the form illustrated in FIGURES 18 and 19.

While a number of embodiments of the invention are herein illustrated and described, it will be understood that further changes may be made in the constructions and arrangement of elements without departing from the spirit or scope of the invention. Therefore, without limitation in this respect the invention is defined by the following claims.

We claim:

1. In a cart for transporting articles of the type having a wheeled frame of a shape to telescope in a correspondingly shaped frame of another cart and a receptacle having a bottom and pivotally mounted on the frame for rocking movement from a forwardly extending to an upright position by the engagement of its forward end with the rear of another cart, the improvements in such a cart comprising a frame having spaced upright stanchions with forwardly projecting and inwardly tapered upper and lower supports, of means acting directly on said receptacle to apply a force thereon opposing the force of gravity and tending to move it to an upright position, a gate hingedly mounted on the forward end of said receptacle to close the end thereof in one position and form an extension of its bottom in another position, a frame at the rear of said receptacle providing a combined handle and guide structure and having an abutment for engagement by the forward end of the receptacle of another cart, said wheeled frame having a baby seat mounted thereon between the upright stanchions and which acts as a truss to reinforce the frame, a second receptacle pivotally mounted on said wheeled frame and having a forwardly projecting inclined end, said wheeled frame having means projecting upwardly at an angle to rock the second receptacle of another cart to upright position when engaged therewith, and said upper and lower supports of the frame underlying the first and second receptacles to limit their downward rocking movement on the frame and providing a support therefor.

2. In a cart for transporting articles of the type having a wheeled frame of a shape to telescope in a correspondingly shaped frame of another cart, an upright fixed receptacle mounted on the frame and a receptacle having a bottom and pivotally mounted on the frame for rocking movement from a forwardly extending to an upright position by the engagement of its forward end with another cart, the improvements in such a cart of means acting between said fixed and movable receptacle to apply a force on said movable receptacle opposing the force of gravity and tending to move it to an upright position, a gate pivotally mounted in the forward end of said receptacle to close the end thereof in one position and form an extension of its bottom in another position, and a combined handle and guide structure comprising a frame at the rear of said fixed receptacle and having spaced upwardly extending rails projecting rearwardly from the fixed receptacle and forming an abutment slide for engagement by the forward end of the receptacle of another cart, and a transverse bar between the rearwardly projecting spaced rails forming a handle.

3. In a cart for transporting articles of the type having a wheeled frame of a shape to telescope in a correspondingly shaped frame of another cart and a receptacle having a bottom and side walls and pivotally mounted on the frame for rocking movement from a forwardly extending to an upright position by the engagement of its forward end with the rear of another cart, the improvements in such a cart of a gate pivotally mounted in the forward end of said receptacle to close the end thereof in one position and form an extension of its bottom in another position, a combined handle and guide structure having a frame at the rear of said receptacle with spaced upwardly extending rails forming an abutment slide for engagement by the forward end of the receptacle of another cart and a transverse bar between said spaced rails forming a handle, a second receptacle pivotally mounted on said wheeled frame and having a forwardly projecting inclined end, and said wheeled frame having stanchions projecting upwardly at an angle to rock the second receptacle of another cart to upright position when engaged thereby.

4. In a cart for transporting articles of the type having a wheeled frame of a shape to telescope in a correspondingly shaped frame of another cart and a rectptacle pivotally mounted on the frame for rocking movement from a forwardly extending to an upright position by engagement of its forward end with the rear of another cart, the improvement in such a cart of a second receptacle pivotally mounted on said wheeled frame and having a forwardly projecting inclined end, and said wheeled frame having stanchions projecting upwardly at an angle to rock the second receptacle of another cart to an upright position when engaged thereby.

5. A cart for transporting articles having a frame with a forwardly projecting support tapered from front to rear to adapt it to telescope and nest with the frames of other carts, one within the other, wheels depending from said frame to adapt it to be rolled from one location to another, a forwardly projecting movable receptacle having a bottom and side walls projecting upwardly from the bottom, said receptacle being hingedly mounted on the support of the frame at the rearward edge of the bottom wall for rocking movement to an upright position whereby the center of gravity of the receptacle is positioned rearwardly of its hinged connection with the frame support in its upright position to hold the receptacle in equilibrium in said position, and means connected to the receptacle for applying a force thereon tending to counterbalance the action of gravity in its forwardly extending position whereby to adapt the receptacle to be rocked in its two positions of equilibrium in either direction by the application of a small manual force.

6. A cart in accordance with claim 5 in which the means tending to counterbalance the action of gravity comprises a torsion bar acting between the frame and movable receptacle for increasing the resistance to movement of the receptacle as the latter approaches its lower forwardly projecting position when the moment of force acting on the receptacle is at a maximum.

7. A cart in accordance with claim 5 in which a fixed receptacle is rigidly mounted on the support of the frame rearwardly of the forwardly projecting movable receptacle, said fixed receptacle having a bottom aligned with the bottom of the movable receptacle, sides positioned inwardly of the sides of the movable receptacle and a back, and a pair of torsion bars connected between the fixed and movable receptacles and tensioned so as to cushion the downward movement of the movable receptacle and retain it in its upright position.

8. A cart in accordance with claim 7 in which the torsion bars extend generally parallel to the hinge axis of the movable receptacle, and each of said torsion bars having angularly projecting ends connected to the fixed and movable receptacles, respectively.

9. A cart in accordance with claim 5 in which the pivotal mounting for the forwardly projecting receptacle is a rod, and the means tending to counterbalance the force of gravity are springs having coils surrounding the rod with ends connected to the frame and receptacle, respectively.

10. A cart in accordance with claim 5 in which the means tending to counterbalance the force of gravity is a counter-weight located at the opposite side of the hinge axis of the forwardly projecting receptacle from its center of gravity in its horizontal position.

11. A cart for transporting articles having a supporting frame with spaced upright stanchions and forwardly projecting inwardly tapered bars forming upper and lower supports open at one side to adapt them to telescope and nest in the frame of other carts, one within the other, wheels depending from said frame to adapt it to be rolled from one location to another, a fixed receptacle rigidly mounted on the upper support at the rear thereof, a forwardly projecting movable receptacle hingedly mounted on the upper support of the frame forwardly of the fixed receptacle for rocking movement to an upright position enclosing the latter, said movable receptacle having a bottom and side walls with inclined ends projecting forwardly beyond the bottom, said forwardly projecting bars of the upper support underlying the movable receptacle to limit its downward rocking movement and support its weight, a gate for closing the forward end of the receptacle and having pins projecting from its ends, hinges pivotally connecting the lower edge of the gate to the forward edge of the bottom, brackets at the top of the forward ends of the side walls of the receptacle and having slots therein, and the slots in the brackets at the upper ends of the side walls being open at the top to receive the pins on the gate and adapt the gate to be lifted to disengage the pins so that the gate may rock on the hinges at the bottom of the receptacle.

12. A cart in accordance wit claim 11 in which rearwardly projecting latching detents are provided on the brackets which project rearwardly into the slot over the pins on the gate to require a combined rearward and upward movement of the gate to release the pins from the brackets.

13. A cart for transporting articles having a frame with a support open at the rear and tapering inwardly toward the front to adapt it to telescope and nest with the frame of another cart, one within the other, wheels depending from said frame to adapt it to be rolled from one location to another, a fixed receptacle rigidly mounted on the frame support, a forwardly projecting receptacle hingedly mounted on the support of said frame for rocking movement from a horizontal position overlying the support to an upright position at right angles to the support, said forwardly projecting receptacle having a forwardly inclined end providing a cam surface, and a combined handle and guide structure having spaced inclined rails projecting rearwardly from the fixed receptacle for providing an abutment engaged by the forwardly inclined cam surface at the end of the receptacle of another cart to automatically lift said receptacle when two carts are moved into engagement with each other, front to back, and a bar extending between the spaced rails transversely of the cart at the rear of the hinged receptacle to provide a handle.

14. A cart for transporting articles having a frame with upper and lower supports tapered from front to rear to adapt it to telescope and nest with the frame of another cart, one within the other, wheels depending from said frame to adapt it to be rolled from one location to another, an upright fixed receptacle rigidly mounted on the upper support at the rear thereof, a forwardly projecting movable receptacle hinged on the upper support of the frame forwardly of the upright fixed receptacle for rocking movement to an upright position enclosing the latter, said fixed receptacle comprising an auxiliary frame having spaced upright slide sections at the rearward side thereof, said slide sections extending rearwardly and then forwardly from the bottom upwardly to provide rails spaced from the rear of the fixed receptacle, a bar extending between the rearwardly projecting rails of the upright bars to provide a handle, and the forwardly inclined sections of the rails above the handle being engageable by the end of the forwardly projecting receptacle of another cart to tilt the receptacle thereof to an upright position.

15. A cart in accordance with claim 14 in which spaced pairs of brackets are provided for clamping the fixed receptacle to the upper support of said frame, a rod on the forwardly projecting receptacle adjacent the rearward edge thereof, and one pair of the spaced brackets having a flange overlying the rod on the forwardly projecting receptacle to provide journal bearings.

16. A cart in accordance with claim 15 in which a second receptacle is pivotally mounted on the lower support of the frame for rocking movement therein.

17. A cart for transporting articles having a frame with upper and lower supports tapered from front to rear to adapt it to telescope and nest in the frame of another cart, one within the other, wheels depending from said frame to adapt it to be rolled from one location to another, a fixed receptacle rigidly mounted on the upper support at the rear thereof, a forwardly projecting movable receptacle hingedly mounted on the upper support of the frame forwardly of the fixed receptacle for rocking movement to an upright position enclosing the latter, said frame comprising spaced upright stanchions, a seat for a child mounted on the frame between the stanchions, and said seat acting as a truss between the upright stanchions to reenforce the frame.

18. A cart for transporting articles having a frame with upright stanchions and upper and lower forwardly projecting supports open at the rear and tapered inwardly from the rear toward the front to adapt it to telescope and nest in the frame of another cart, one within the other, wheels depending from said frame to adapt it to be rolled from one location to another, a fixed receptacle rigidly mounted on the upper support and having a bottom, sides and back, a forwardly projecting movable receptacle hingedly mounted on the upper support of the frame forwardly of the fixed receptacle for rocking movement to an upright position enclosing the latter, said forwardly projecting upper support of the frame being engaged by the bottom of the forwardly projecting receptacle to limit its downward movement and provide a support therefor, a shelf in the fixed receptacle extending between the sides thereof, a tray having a bottom, front and sides pivotally mounted on the sides of the fixed receptacle for rocking movement into and out of the latter, and the shelf being aligned with the bottom of the tray and forming a stop to limit the rocking movement of the tray whereby the bottom of the tray projects forwardly from the fixed receptacle and forms a continuation of the shelf and is rocked inwardly into the fixed receptacle when the movable receptacle is rocked upwardly.

References Cited by the Examiner
UNITED STATES PATENTS

| | | | |
|---|---|---|---|
| 2,590,048 | 3/1952 | Sides | 280—33.99 |
| 2,605,116 | 7/1952 | Alexander | 280—33.99 |
| 2,813,725 | 11/1957 | Hoidinghaus | 280—33.99 |
| 2,943,707 | 7/1960 | Ramlose | 186—1.1 |
| 3,039,564 | 6/1962 | Shaukis | 280—33.99 |
| 3,039,783 | 6/1962 | Stanley | 280—33.99 |
| 3,083,791 | 4/1963 | Shaffner | 186—1.1 |
| 3,115,975 | 12/1963 | Thompson | 186—1.1 |

EVON C. BLUNK, *Primary Examiner.*

ANDRES H. NEILSEN, SAMUEL F. COLEMAN,
*Examiners.*